United States Patent [19]

Rose et al.

[11] 4,131,538
[45] Dec. 26, 1978

[54] METHOD OF SEPARATING A PREDETERMINED FRACTION FROM PETROLEUM OIL USING MULTISTAGE EVAPORATORS

[75] Inventors: Charles D. Rose; Frederick W. Gilbert, both of Shreveport, La.

[73] Assignee: Riley-Beaird, Inc., Shreveport, La.

[21] Appl. No.: 843,831

[22] Filed: Oct. 20, 1977

Related U.S. Application Data

[63] Continuation of Ser. No. 674,223, Apr. 6, 1976, abandoned.

[51] Int. Cl.² .............................................. C10G 7/00
[52] U.S. Cl. .................................... 208/352; 196/100; 202/174; 203/81; 203/82; 208/353; 208/355
[58] Field of Search ............... 208/352, 353, 354, 355, 208/358, 365; 196/100; 202/173, 174; 203/81, 82

[56] References Cited

U.S. PATENT DOCUMENTS

| | | | |
|---|---|---|---|
| 1,997,675 | 4/1935 | Bahlke et al. | 208/365 |
| 2,085,422 | 6/1937 | Fast | 208/355 |
| 2,426,110 | 8/1947 | McCorquodale et al. | 208/353 |
| 2,995,499 | 8/1978 | Dukeler et al. | 208/352 |
| 3,244,600 | 4/1966 | Sinex | 208/358 |
| 3,308,060 | 3/1967 | Ellis | 208/354 |

Primary Examiner—Herbert Levine
Attorney, Agent, or Firm—Mason, Kolehmainen, Rathburn & Wyss

[57] ABSTRACT

A method and apparatus for separating a predetermined fraction from a crude oil includes preheating the crude oil to vaporize a portion, and feeding the two-phase crude to a first stage flash evaporator. In the first stage evaporator, a vapor portion is separated from residual liquid and the residual liquid is used by means of heat exchange to preheat the crude oil. The vapor fraction from the first stage evaporator has an approximate 90% ASTM distillation temperature about 50–60° F higher than the first stage evaporator temperature. The vapor fraction is condensed to form a condensate, and the condensate is conveyed to a stripping column for mass transfer with ascending vapors from a second stage boiling type evaporator. The second stage evaporator is operated at a vaporization temperature approximately equal to the 5% ASTM vaporization temperature of the predetermined petroleum fraction collected as liquid from the second stage evaporator. Vapors removed from the stripping column include a crude oil fraction having an ASTM flash temperature lower than the temperature of operation of the second stage, and crude oil volatile impurities.

26 Claims, 9 Drawing Figures

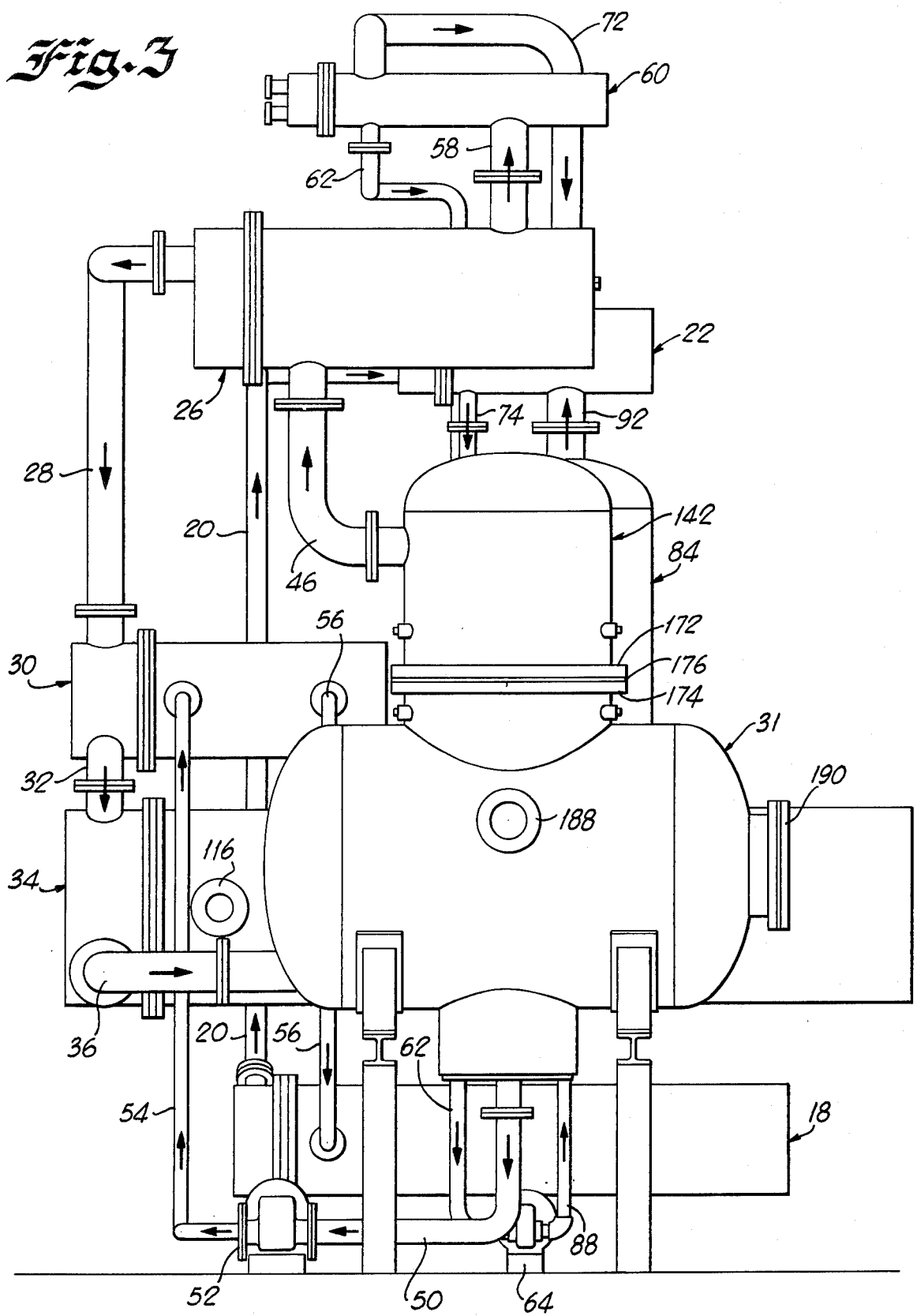

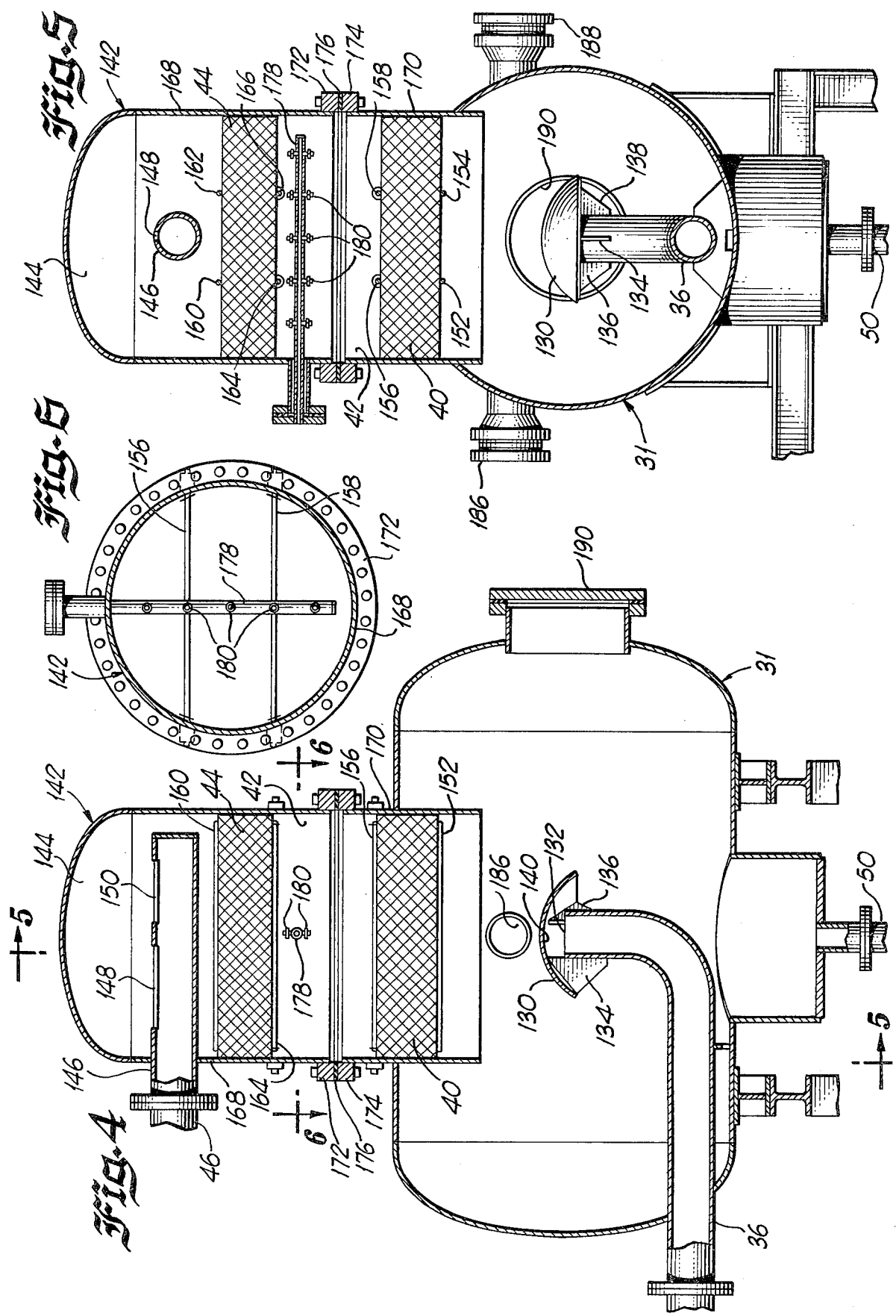

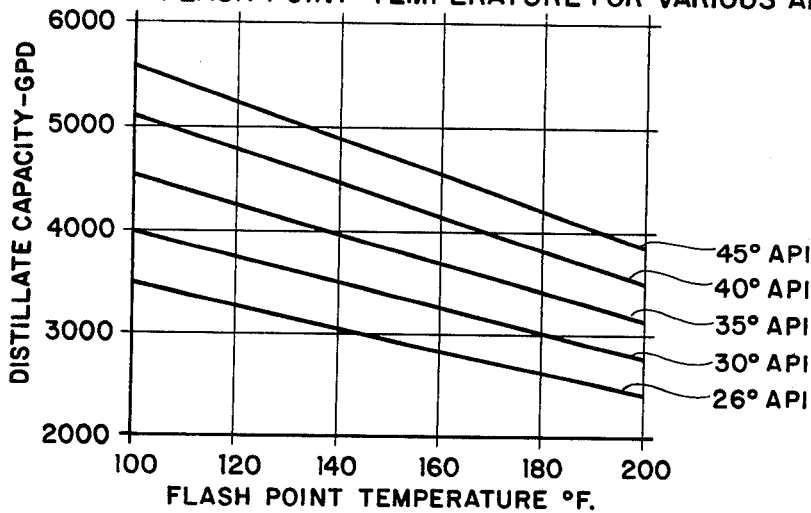
*Fig. 7* — ESTIMATED DISTILLATE CAPACITY VS. FLASH POINT TEMPERATURE FOR VARIOUS API CRUDES
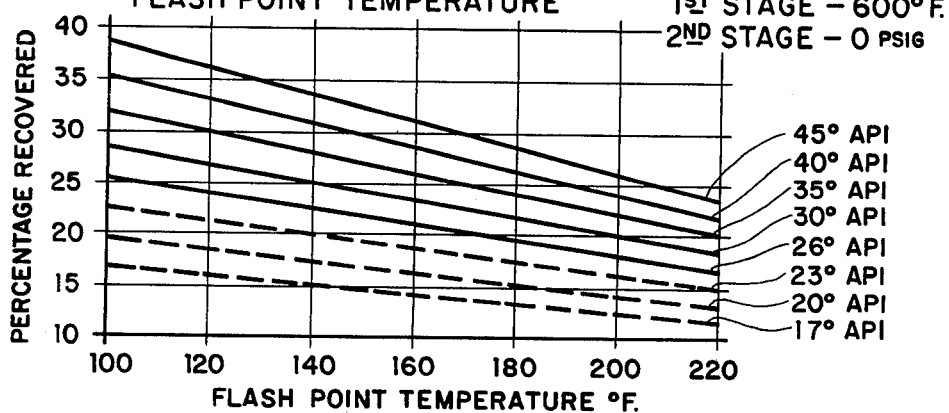
*Fig. 8* — ESTIMATING CURVE: PERCENTAGE FEED RECOVERED AS DISTILLATE VS. FLASH POINT TEMPERATURE  
1ST STAGE — 600°F.  
2ND STAGE — 0 PSIG
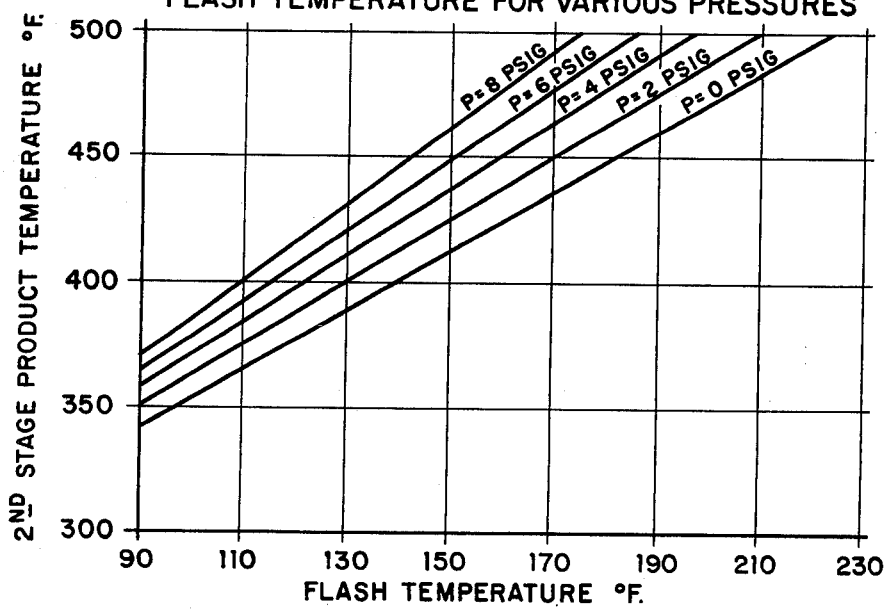
*Fig. 9* — DESIGN CURVE: 2ND STAGE PRODUCT TEMPERATURE VS. FLASH TEMPERATURE FOR VARIOUS PRESSURES

METHOD OF SEPARATING A PREDETERMINED FRACTION FROM PETROLEUM OIL USING MULTISTAGE EVAPORATORS

This is a continuation of application Ser. No. 674,223, filed Apr. 6, 1976, now abandoned.

BACKGROUND OF THE INVENTION

Field of the Invention

The present invention relates to a method and apparatus for separating fractions of a multicomponent liquid such as petroleum oil and, more particularly, relates to a method for separating distillate fuel from crude oil using multistage flash and boiling evaporator apparatus arranged in proper order. Current methods for producing a distillate fuel from crude oil follow most large refinery processes by initially heating the crude to a temperature in the range of about 800–1000° F. and then refining the heated crude oil to separate various fractions of the oil at different heights in a distillation column, via condensation.

In accordance with the present invention, various fractions of a crude oil and, particularly, distillate fuel, can be separated using a multistage evaporator arrangement.

Prior Art

It is known to use multistage flash evaporators to distill liquid containing dissolved solids such as sea water, as disclosed in the Williamson U.S. Pat. No. 3,399,118. However, such multistage evaporators are not used to separate a plurality of components having very similar vaporization temperatures, as exists in distillation of crude oil. To date, multistage evaporator apparatus has not been used in the distillation of crude oil. The Williamson U.S. Pat. No. 3,418,213 relates to a flash evaporator apparatus similar to the flash evaporator forming the first evaporator stage of the apparatus of the present invention.

SUMMARY OF THE INVENTION

In accordance with the principles of the present invention, a desired fraction of crude oil is separated in a multistage evaporator having at least two stages. Crude oil is preheated to a desired temperature and conveyed to a first stage flash evaporator. In a preferred embodiment, the crude oil is preheated through a total of 385 F.° of the 515 F.° total rise in temperature by preheating from product, residual liquid from the first stage, and overhead vapors from both stages. Raw heat input to the crude oil preheats the crude the remaining 130 F.° to a preferred temperature of about 585° F. In the first stage evaporator, a portion of the crude oil capable of vaporizing at the temperature of the crude fed to the first stage, is separated from the incoming two phase mixture, leaving a residual liquid. The resulting vapors from the first stage are conveyed to a first overhead condensing means maintained at a temperature such that a higher boiling fraction of the vapors conveyed to the condenser are condensed and a lower boiling fraction remains as vapor. The resulting condensate from the first overhead condensing means is conveyed to a second stage boiling evaporator wherein a lower boiling fraction of the condensate is vaporized and a higher boiling fraction is collected as liquid product. To achieve the full advantage of the present invention, the second stage evaporator should be a boiling type evaporator. If the second stage evaporator were a flash evaporator, about 25% capacity of the process would be lost due to the vaporization temperature range inherent in flash evaporator apparatus. In a preferred embodiment, the uncondensed vapors from the first overhead condensing means are conveyed to a second overhead condensing means, where the vapors are further cooled to condense the remaining vapors from the first stage.

In accordance with an important feature of the present invention, a mass transfer means is disposed in fluid communication with the second stage evaporator apparatus and the liquid condensate formed from the first stage vapors are conveyed to an upper portion of the mass transfer means for rectification by rising vapors formed in the second stage evaporator. In this manner, a lower boiling portion of the first stage condensate will transfer to the rising vapors in the second stage and a higher boiling portion of the rising vapors will transfer to the condensate to be recovered as product from the second stage evaporator. Without the mass transfer column in fluid communication with the second stage evaporator, recovery of the desired fraction product from the second stage evaporator can only be about 70%, the remaining 30% being entrained in the residual liquid from the first stage and in the overhead condensed in the second overhead condensing means. Because of this feature, the second stage should be a boiling evaporator rather than a flash evaporator in order to maximize the final amount of product produced from a given crude. The stripping column in fluid communication with the second stage evaporator assures an approximate 95% or better recovery of the desired crude oil fraction which is available in the crude being fed to the system for processing.

Residual liquid recovered from the first stage and product recovered from the second stage can be used to preheat the crude oil fed to the first stage evaporator apparatus. An extraneous heating source can also be used to provide sufficient heat to the crude oil feed to heat the crude oil to the desired first stage evaporator flash temperature. The uncondensed vapors from the first overhead condensing means are conveyed to the second overhead condensing means where these vapors are condensed and collected as a separate fraction. In a preferred embodiment of the present invention, uncondensed vapors from the first overhead condensing means, comprising a lower boiling portion of the first stage evaporator overhead vapors, and vapors from the second stage evaporator apparatus, collected as an overhead from the mass tranfer means, are condensed together in the second overhead condensing means to provide a combined "light" liquid overhead fraction.

To stabilize the process and keep the process in heat balance, some energy must be removed from each stage and discharged to the environment. This is accomplished by the installation of a heat rejection section in each stage. The coolant for each of these sections can be cooling water, additional crude, air, and the like. Temperature control devices can be used to control the amount of heat removed from each stage. The reason that this auxiliary heat exchange is required is that the total amount of heat which must be removed from each stage is more than can be recovered by heating the incoming crude. In order to obtain maximum efficiency, the crude which is to be processed is given preference on the recovery of the heat rejected from each stage.

Another important feature of the process of the present invention is that forward feed should be used or separation will not be properly accomplished, resulting in a product having an uncontrollable flash point. Heat from a heat input source should be used to vaporize liquid in the second stage in order to control properly the process operation. If the second stage evaporator is attempted to be run by a heat reclaiming method, the process is unstable and will not be suitable.

Accordingly, an object of the present invention is to provide a new and improved method and apparatus for separating a predetermined fraction from a crude oil having a desired boiling point range.

Another object of the present invention is to provide a new and improved method and apparatus for separating distillate number 2 from crude oil.

Another object of the present invention is to provide a new and improved method of separating a desired fraction from crude oil using multistage evaporator apparatus.

Another object of the present invention is to provide a new and improved method for separating a predetermined fraction from crude oil using apparatus comprising a first stage flash evaporator, and a second stage boiling type evaporator in fluid communication with a stripping column.

Another object of the present invention is to provide a method and apparatus for separating a distillate number 2 product from crude oil wherein the distillate product meets ASTM standards and has an acceptable and controllable flash point.

Another object of the present invention is to provide a new and improved method and apparatus for separating a predetermined fraction from crude oil comprising a first stage flash evaporator having a feed temperature which controls the end point, or 90% point, of the product distillation curve.

Another object of the present invention is to provide a new and improved method and apparatus for separating a predetermined fraction from crude oil comprising a second stage evaporator having heat supplied thereto to provide a second stage operation temperature which controls the product flash point temperature.

Another object of the present invention is to provide a new and improved method and apparatus for separating distillate number 2 from crude oil comprising a first stage flash evaporator having a first overhead condensing means in fluid communication therewith, including a coolant for condensing a portion of the overhead vapors from the first stage, wherein the temperature of the coolant controls the temperature of a condensate conveyed to a second stage through mass transfer with vapors formed in the second stage.

Another object of the present invention is to provide a method and apparatus for distilling crude oil wherein the apparatus is smaller, lighter and occupies less space than contemporary crude oil distillation apparatus.

Another object of the present invention is to provide a new and improved method and apparatus for separating a predetermined fraction from crude oil wherein the apparatus requires fewer and simpler controls, can be put on line in less than half the time of existing processes, is easier to operate and stabilize, is more easily packaged and transported, requires little or no operator attention, and provides a predetermined crude oil fraction at much less cost per barrel of product.

Another object and an important feature of the present invention is to separate a predetermined distillate fraction of crude oil without subjecting the crude oil to typically high cracking tower temperatures on the order of 800–1000° F. Such high temperatures cause formation of an undesirably high percentage of unwanted side products formed in the distillation apparatus as reaction products of crude oil impurities, such as wax and sulfur. Further, reaction products such as $H_2S$ or other contaminants, which may form in the first stage evaporator apparatus of the present invention are removed in the second stage evaporator as vapor and are vented or condensed as a separate overhead fraction.

The foregoing and other objects and advantages of the present invention are accomplished in an illustrative embodiment which comprises a new and improved method of separating a desired fraction from crude oil using a first stage flash evaporator in combination with a second stage boiling type evaporator. It is understood that additional stages can be used to provide a desired fraction from crude oil. Referring now to the drawing, and initially to the flow diagram of FIG. 1, there is illustrated a schematic representation of the process of the present invention useful for separating a desired fraction from crude oil. In the foregoing illustrative embodiment, the process will be described for separating 15,000 gallons per day of distillate number 2, operating the evaporator stages at about atmospheric pressure. Throughout the various figures of the drawings, like reference numerals are used to designate corresponding parts.

BRIEF DESCRIPTION OF THE DRAWINGS

FIG. 3 is an elevated side view of the new and improved apparatus constructed in accordance with the principles of the present invention.

FIG. 4 is a partially broken away, partially elevated cross-sectional view of the new and improved first stage flash evaporator apparatus constructed in accordance with a preferred embodiment of the present invention, taken along the lines 4—4 of FIG. 2.

FIG. 5 is a partially broken away, partially elevated cross-sectional view of the new and improved first stage flash evaporator apparatus constructed in accordance with the principles of the present invention, taken along the lines 5—5 of FIG. 4.

FIG. 6 is a partially broken away, partially elevated cross-sectional view of the new and improved first stage flash evaporator apparatus, taken along the lines 6—6 of FIG. 4.

FIG. 7 is a graph of Estimated Distillate Capacity vs. Flash Point Temperature for various API crude oils.

FIG. 8 is a graph of Percentage Feed Recovered as Distillate vs. Flash Point Temperature for various API crude oils.

FIG. 9 is a graph of Second Stage Product Temperature vs. Flash Temperature for various API crude oils.

DETAILED DESCRIPTION OF THE PREFERRED EMBODIMENT

Figure 1:
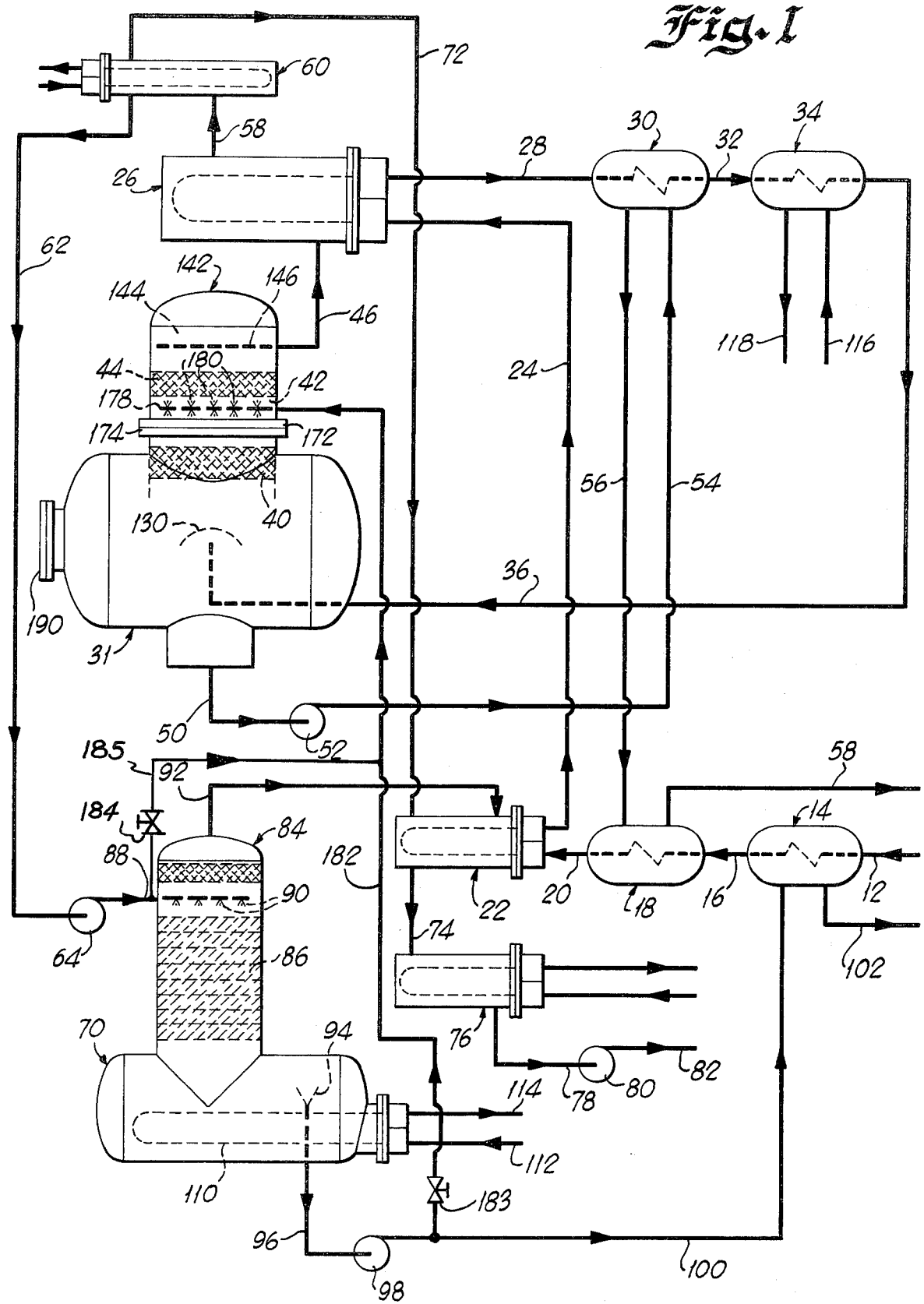
FIG. 1 is a schematic flow diagram of the new and improved method and apparatus of the present invention.
Figure 2:
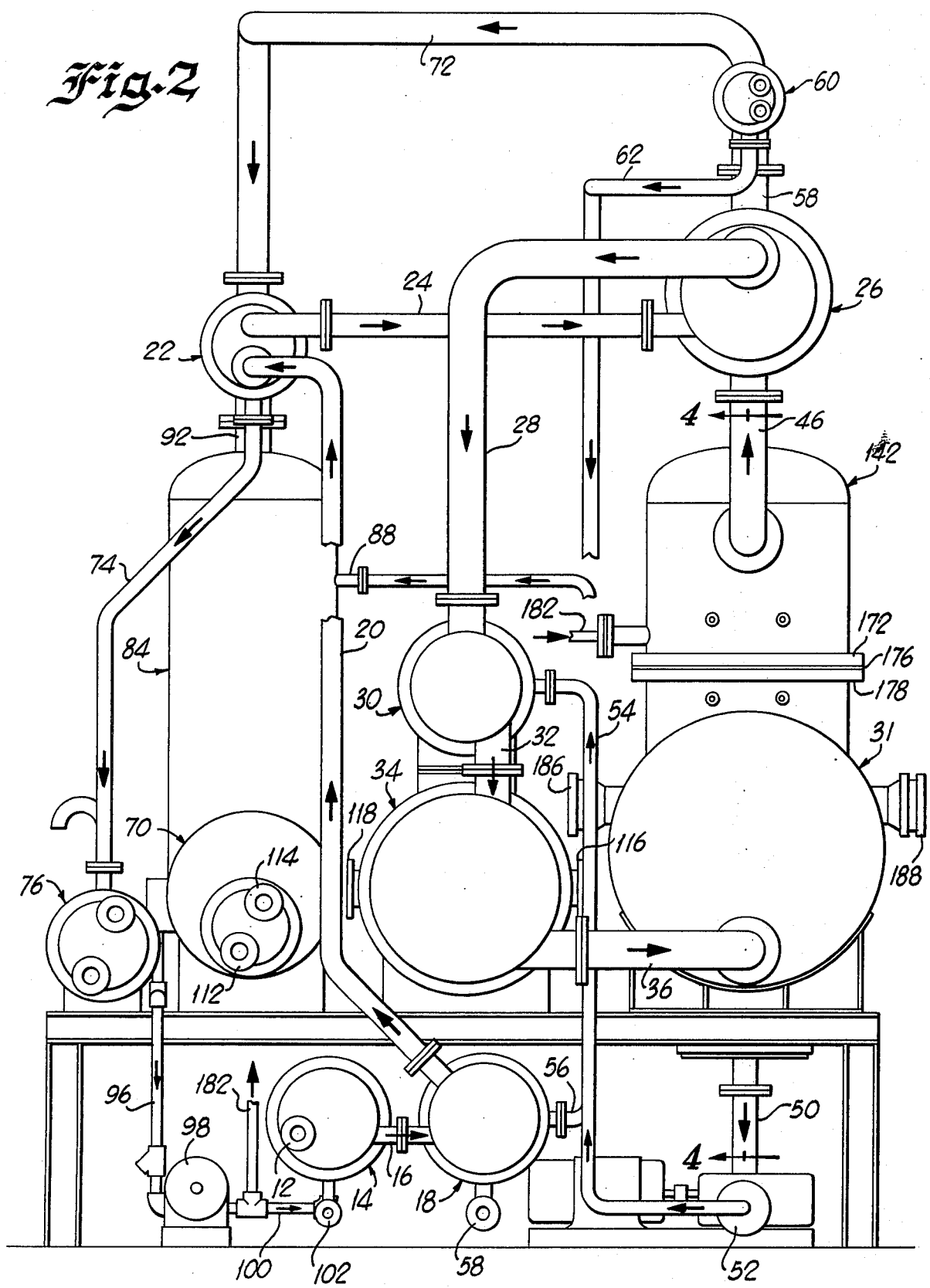
FIG. 2 is an elevated front view of the new and improved apparatus constructed in accordance with the principles of the present invention.

Turning now to the flow diagram of FIG. 1 and the associated FIGS. 2 and 3, crude oil is conveyed along conduit 12 at a rate of 22,277 pounds per hour and at a temperature of 70° F. to a tube side of shell and tube heat exchanger 14 where the crude oil is preheated to 129.6° F. by distillate number 2 product passing through a shell side of heat exchanger 14. The preheated crude oil leaves heat exchanger 14 and is conveyed along conduit 16 to a tube side of shell and tube heat exchanger 18 where the crude oil is further preheated to 262.6° F. by residual liquid passing through a shell side of heat exchanger 18. The twice preheated crude oil exits heat exchanger 18 containing 7.5% by weight vapor and is conveyed at a temperature of 262.6° F. along conduit 20 to a tube side of shell and tube heat exchanger 22, forming a first portion of a second stage overhead vapor condenser. In heat exchanger 22 the twice preheated two-phase crude oil is heated to 284.4° F. by overhead vapors from each stage of multistage evaporator apparatus, flowing through a shell side of heat exchanger 22. The preheated crude oil containing 9% by weight vapor is discharged from heat exchanger 22 and is conveyed along conduit 24 to a tube side of shell and tube heat exchanger 26, at a temperature of 284.4° F. containing 9% vapor, where the crude is further preheated by vapors from a first stage evaporator flowing through a shell side of heat exchanger 26.

The two-phase crude oil leaves heat exchanger 26 along conduit 28, containing 18% by weight vapor, at a temperature of 400.4° F., to shell and tube exchanger 30. The crude flows through a tube side of shell and tube exchanger 30 and is heated by a residual liquid flowing through a shell side of heat exchanger 30, gathered from the bottom of a first stage flash evaporator 31. The crude oil leaves heat exchanger 30 along conduit 32 with a vapor content of 23.5% by weight and at a temperature of 454.9° F. From conduit 32 the two-phase crude oil is conveyed to a tube side of shell and tube heat exchanger 34 heated on its shell side by an extraneous heating fluid which is stable at the temperature required, such as a eutectic mixture of diphenyl and diphenyl oxide, stable to 725° C. In the preferred embodiment, the heating fluid is conveyed through heat exchanger 34 at 110,000 pounds per hour and 630° F. to preheat the crude to 585° F. The 585° F. crude oil containing 40.5% by weight vapor is conveyed at a rate of 22,277 pounds per hour along conduit 36 into the first stage evaporator 31, preferably maintained at or slightly above atmospheric pressure. For safety reasons the first stage evaporator 31 is not operated under vacuum, although technically it could be operated both above and below atmospheric pressure.

In first stage evaporator 31, that portion of the crude oil having a vaporization temperature less than or equal to 585° F., at approximately one atmosphere pressure, vaporizes and proceeds upwardly through wire mesh 40 in vapor conduit 42 and leaves first stage evaporator 31 as an overhead vapor through conduit 46 at a temperature of 585° F. and at a rate of 9,022 pounds per hour.

The temperature of the preheated feed to the first stage flash evaporator 31 controls the end point (90% ASTM vaporization point) of the product distillation curve. A higher boiling fraction of the crude oil fed to first stage flash evaporator 31 is collected as a liquid residual from the first stage, used to preheat the first stage feed crude oil, and is collected as residual liquid. For producing distillate number 2, it is preferred to preheat the crude oil fed to the first stage to a temperature of 585° F., although other temperatures meeting the ASTM specifications for 90% distillation temperatures of predetermined crude oil fractions can be used. The 90% ASTM distillation curve temperature of the product will generally be about 40-60 F.° higher than the temperature of operation of the first stage evaporator.

An unvaporized residual liquid fraction, having a vaporization temperature greater than 585° F., is collected at the bottom of the first stage evaporator 31 at a rate of 13,255 pounds per hour at 585° F. This residual liquid is conveyed along conduit 50 by residual liquid pump 52, and from pump 52 the residual liquid is conveyed along conduit 54 to heat exchanger 30 where the residual liquid is cooled to 475° F. and the crude oil is preheated to 454.9° F. The residual liquid from heat exchanger 30, discharged at a rate of 13,255 pounds per hour and a temperature of 475° F., is conveyed along conduit 56 to heat exchanger 18 for further cooling of the residual liquid to 225° F. and for further preheating of the crude oil feed, as described above. The residual liquid is collected from conduit 58 after being discharged from heat exchanger 18 at 225° F. and at a rate of 13,255 pounds per hour.

The vapors formed in first stage evaporator 31 leave the evaporator as an overhead vapor through conduit 46 at a rate of 9,022 pounds per hour and at a temperature of 585° F., and the overhead vapor is conveyed into the shell side of heat exchanger 26. In heat exchanger 26, the hot vapors are cooled to 375° F. by condensing and giving up sensible heat and are discharged from heat exchanger 26 through conduit 58. The remaining 375° F. vapors and condensed liquid from heat exchanger 26 are conveyed into a separate water-cooled heat exchanger 60 at a combined rate of 9,022 pounds per hour. In heat exchanger 60, additional first stage vapors condense, giving up latent heat of condensation and sensible heat. The liquid condensate from heat exchanger 60 is conveyed at a rate of 6,795 pounds per hour along conduit 62 at a temperature of 300° F. by condensate pump 64 to an upper portion of second stage evaporator apparatus 70. The remaining vapors (light ends) 2,227 pounds per hour, at 300° F., are conveyed by conduit 72 to second stage overhead condenser 22 and 76 where these remaining vapors are condensed and further cooled to 125° F.

An important feature of the present invention is to condense a fraction of the overhead vapor from first stage evaporator 31 and collect the condensate at a temperature lower than the operation temperature of second stage evaporator 70 for intimate contact and mass transfer between the collected condensate and rising vapors from the second stage evaporator 70. To realize the full advantage of the present invention, the temperature of the condensate formed by condensing a portion of the overhead vapors from the first stage flash evaporator 31 should be at least 50 F.° and preferably in the range of 50-150 F.° lower than the temperature of operation of the second stage evaporator 70. This temperature differential is provided to insure that at least 95% of the crude oil fraction, having a flash temperature equal to the temperature of operation of the second stage evaporator 70 and having a 90% end point on the ASTM distillation curve about 40-60 F.° higher than the temperature of operation of the first stage evaporator 31, will be conveyed to the second stage evaporator 70. Unless the temperature of the condensate fed to the second stage evaporator 70 is lower than the temperature of operation of the second stage, an undesirably high percentage of potential product, having a vaporization temperature between the temperatures of the first and second stage evaporators, is lost as uncondensed vapors from the first overhead condensing means. In accordance with the present invention, at least 95% of the crude oil fraction, having a flash temperature substantially equal to the temperature of operation of the second stage evaporator 70 and having a 90% end point on the ASTM distillation temperature curve about 40-60 F.° higher than the temperature of operation of the first stage evaporator 31, is collected as a product from the second stage evaporator 70. The temperature of the condensate from the first overhead condensing means, collected from heat exchanger 60, can be decreased further and the temperature of the second stage evaporator 70 can be lowered in the production of other distillates to provide a wider boiling point range fraction, so long as required specifications are met.

The remaining 2,227 pounds per hour of uncondensed vapors from heat exchanger 60 are conveyed at 300° F. along conduit 72 to a shell side of heat exchanger 22 where these vapors combine with 2,295 pounds per hour of overhead vapors from the second stage evaporator apparatus 70 to preheat the crude oil to 284.4° F. on route to the first stage evaporator apparatus. These uncondensed vapors are partially condensed and cooled in heat exchanger 22 to 335° F. and the remaining liquid and vapors are conveyed at a rate of 4,522 pounds per hour along conduit 74 to a separate water-cooled heat exchanger 76. In heat exchanger 76, the majority of the remaining vapors are condensed to recover 4,522 pounds per hour of liquid overhead at a temperature of 125° F. The liquid overhead from heat exchanger 76 is conveyed along conduit 78 by pump 80 and is collected as a liquid overhead product from conduit 82.

Turning now to the second stage evaporator apparatus 70, the condensate from the first stage evaporator apparatus 31, at a temperature of 300° F. and at a rate of 6,795 pounds per hour, is conveyed to an upper portion of a mass transfer means 84 preferably packed with 2-6 feet of a knit packing 86, such as described in U.S. Pat. No. 3,218,048. The mass transfer vessel 84 is disposed in fluid communication with the second stage evaporator apparatus 70 maintained at a temperature of approximately 425° F. The condensate from the first stage is introduced into the mass transfer apparatus 84 through fluid inlet 88, above packing 86, through a plurality of fluid nozzles 90. In mass transfer vessel 84, 2,295 pounds per hour of this condensate, having vaporization temperatures less than 425° F., exits as an overhead vapor through overhead conduit 92, while 4,500 pounds per hour of this condensate, having a vaporization temperature on the ASTM distillation curve in the range of about 425-640° F., is collected as liquid product at a temperature of 425° F., at the bottom of the second stage evaporator apparatus 70 as it flows over weir 94 into conduit 96. A total of approximately 6,795 pounds per hour is vaporized in the second stage evaporator 70. The liquid product, collected from second stage evaporator apparatus 70, is conveyed by pump 98 along conduit 100 at a temperature of approximately 425° F. through a shell side of heat exchanger 14 where the product is cooled to 130° and collected from conduit 102.

By providing the condensate from heat exchanger 60, on route to second stage evaporator 70 through mass transfer means 84, at a temperature of 300° F., it is assured that at least 95% of the crude oil fraction having a vaporization temperature of about 425° F. and a 90% distillation temperature of about 640° F. will be conveyed to second stage evaporator apparatus 70. Ideally, only that portion of the crude oil fed to the first stage evaporator 31 having a vaporization temperature in the range of 425-640° F. would be conveyed to the second stage evaporator 70. However, if the condensate from heat exchanger 60 were collected at a temperature of 425° F., a relatively high portion of the crude having a vaporization temperature of say, in the range of 425°-500° F., would be lost as an uncondensed vapor fraction discharged from heat exchanger 60 along conduit 72. For maximum product recovery, the condensate temperature would be as low as possible. However, the lower the condensate temperature the higher the heat required into the second stage evaporator 70 to operate the second stage at a desired temperature for producing a product having a 5% vaporization temperature on the ASTM distillation curve substantially at the temperature of operation of second stage evaporator apparatus 70. Accordingly, for recovery of distillate number 2, it is preferred that the condensate temperature from heat exchanger 60 be about 300° F. to achieve a product flash temperature of about 150° F.

The stripping column 84, or other mass transfer means, is disposed in fluid communication with the second stage evaporator 70 and provides mass transfer between ascending vapors from the second stage evaporator 70 and descending condensate from heat exchanger 60. In this manner, a lower boiling fraction of the condensate, generally in the range of 300-425° F. is transferred to the vapors rising in the stripping column 84 so that this lower boiling fraction is removed from the column along conduit 92 to be condensed and collected as overhead. Volatile contaminants entrained in the condensate fed to stripping column 84 are also vaporized and removed from the column along conduit 92. The higher boiling fraction of the condensate from the heat exchanger 60, having a 5% vaporization point of about 425° F. and having a 90% distillation temperature of about 640° F. is collected from the second stage evaporator 70 as uncontaminated product along conduit 96. Any rising vapors having a 5% vaporization point of about 425° F. and a 90% distillation temperature less than 640° F. will transfer to the descending condensate in column 84 to be collected as product.

The overhead vapor, including volatile contaminants, from second stage evaporator apparatus 70 is conveyed through conduit 92 at a rate of 2,295 pounds per hour, and enters a shell side of heat exchanger 22 where the overhead vapors from the second stage apparatus 70 are combined with 2,227 pounds per hour of uncondensed vapors from heat exchanger 60 to preheat the crude oil to 284.4° F. and to cool the uncondensed vapors to 335° F. The cooled vapors are discharged from heat exchanger 22 through conduit 74 to be condensed as 125° F. overhead liquid product in heat exchanger 76, as described above.

The second stage evaporator apparatus 70 and the heat exchanger 34 are each heated to a desired temperature with a nonvolatile heating fluid, for example, Thermanol 66 of Monsanto. It is preferred to use the same nonvolatile heating fluid as used for heat exchanger 34. Second stage evaporator apparatus 70 is maintained at a desired product flash temperature by circulating the nonvolatile heating fluid through heating tubes 110. To produce distillate number 2, the heating fluid at 630° F. is conveyed through tubes 110 at a rate of 19,823 pounds per hour. The nonvolatile heating fluid is conveyed through inlet conduit 112 and discharged at 580° F. through heating fluid outlet conduit 114. The heating fluid used to heat the crude oil in heat exchanger 34 enters that heat exchanger on the tube side through conduit 116 at a temperature of 630° F. and leaves heat exchanger 34 through conduit 118 at 580° F. A separate heater (not shown) is used to reheat the heating fluid discharged from heat exchanger 34 and from heating tubes 110 from 580-630° F. for continuous recycling.

The first stage flash evaporator apparatus 31 can be of any construction useful in flash evaporating crude oil at about 40-60 F.° below the 90% distillation temperature of the predetermined fraction to be separated. It is preferred to construct the first stage flash evaporator as shown in FIGS. 4-6. Crude oil, preheated to 585° F. and containing 40.5% by weight vapors, enters first stage evaporator 31 through conduit 36. A dome shaped impingement plate 130 is centrally disposed above a crude oil outlet 132 of conduit 36 and is anchored in position to conduit 36 by three support brackets 134, 136 and 138.

Two-phase crude oil entering first stage evaporator 31 through outlet 132 impinges against an undersurface 140 of dome 130. The gases and liquid striking undersurface 140 are directed downwardly to minimize liquid entrainment of liquid into mesh 40 and mesh 44 and to minimize crude foaming in the first stage evaporator 31. The liquid falls from dome 130 as a circumferential sheet into evaporator 31 and the vapors ascend into a vapor separation column 142 of evaporator 31 for further separation of gas from liquid in wire mesh mist elminiators 40 and 44. The vapors proceed upwardly in vapor separation column 142 into vapor space 144. A final impurity separator 146, comprising a vapor conduit having one or more apertures 148 and 150 in its top surface, is disposed in vapor space 144 to prevent any liquid or solids entrained into vapor space 144 from leaving the first stage separators 40 and 44 through conduit 46. Any entrained liquids and solids, ascending within vapor space 144 will not enter apertures 148 and 150 so that the impurities will generally fall back into mesh 44 to coalesce with other entrained liquid and contaminants. Impurities collecting in mesh 44 will fall back into mesh 40, and then into the flash chamber 31 to be removed as residual through conduit 50. A similar impurity separator can be disposed at the top of the mass transfer column 84 of the second stage to direct vapors into conduit 92.

Mesh 40 is removably mounted within vapor separation column 142 between fixed lower support rods 152 and 154, and removable upper support rods 156 and 158. In a like arrangement, mesh 44 is removably mounted within vapor separation column 142 between fixed upper support rods 160 and 162, and removable lower support rods 164 and 166. The vapor separation column is constructed in two sections, an upper section 168 and a lower section 170. The two sections are secured together by bolting an upper annular flange 172 of upper section 168 to a lower annular flange 174 of lower section 170. A resilient gasket 176 is provided between the two flanges 172 and 174 to provide a gas-tight seal between the two sections 168 and 170. The two meshes 40 and 44 occasionally become plugged with impurities and must be cleaned or replaced. Separation of the upper and lower sections 168 and 170 of vapor separation column 142, provides access to removable support rods 156, 158, 164 and 166 to remove meshes 40 and 44 when necessary.

In accordance with an important feature of the present invention, a conduit 178 is disposed within vapor separator 142 between the two mesh mist eliminators 40 and 44. The conduit 178 carries a plurality of spray nozzles 180 directed toward both meshes 40 and 44. Product from second stage evaporator 70 can be conveyed along conduit 182 through conduit 178 and nozzles 180 by opening valve 183 to wash the meshes clean when one or both mist eliminators 40 and 44 become plugged with impurities (see FIG. 1). Alternatively, condensate from heat exchanger 60 can be conveyed from the discharge side of pump 64 through valve 184 along conduit 185 and into conduit 182 to clean the meshes 40 and 44.

The first stage evaporator 31 preferably includes one or more sight glass devices 186 and 188 for viewing the interior of the evaporator and a man way 190 for entrance and cleaning of the evaporator when not in operation.

In accordance with the above-described preferred method and apparatus of the present invention, distillate number 2 is produced meeting all specifications as set forth on page 165, 1973 *Annual Book of ASTM Standards, ASTM Part* 17, © 1973, American Society for Testing & Materials. The amount of product recovered depends upon the crude °API fed into the unit and in particular, the specific API distillation curve for the crude determines how much product per pound of feed can be obtained. Normally, about 25% of the crude oil feed is recovered as product, whether distillate number 2 or some other predetermined fraction. The estimated amount of product recovered, for products having various flash temperatures, for crude oils ranging in °API between 26 and 45 can be obtained from the graph of FIG. 7. The estimated percentage of feed recovered as distillate vs. product flash point temperature for the above-described process can be obtained from the graph of FIG. 8.

For safety reasons, the system is operated at atmospheric pressure and during start-up, a nitrogen purge is used to evacuate all air to prevent explosions. However, the system can be operated at various pressures. The lower the second stage pressure, the lower the second stage temperature required for a particular product flash temperature. The graph of FIG. 9 correlates product flash temperatures with various second stage temperatures and pressures.

The following heat balance for the above-described process, in separating distillate number 2 from crude oil, shows the low energy requirements of the process of the present invention:

| HEAT BALANCE (refer to FIG. 1) | | |
|---|---|---|
| heat exchanger 14 (product cooler) | 663,750 | BTU/hr. |
| heat exchanger 18 (final residual cooler) | 1,656,875 | BTU/hr. |
| heat exchanger 22 (overhead condenser) | 277,075 | BTU/hr. |
| heat exchanger 76 (overhead condenser) | 714,237.5 | BTU/hr. |
| heat exchangers 26 and 60 (condensate condenser) | 472,025 | BTU/hr. |
| heat exchanger 30 (residual cooler) | 729,025 | BTU/hr. |
| heat exchanger 38 (feed heater) | 1,827,828* | BTU/hr. |
| heat required in 2nd stage evaporator 70 | 654,188* | BTU/hr. |

*Does not include radiation

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A method of separating a predetermined fraction from petroleum oil comprising:

preheating the petroleum oil to form preheated petroeum oil;

vaporizing a portion of the preheated petroleum oil to form a first vapor fraction and a first residual liquid;

separating the first vapor from the first residual liquid in a means for separating gas from liquid and removing the first residual liquid such that said first residual liquid does not form part of said predetermined fraction;

condensing at least a portion of said first vapor fraction to form a first condensate;

feeding a petroleum fraction consisting essentially of said first condensate as essentially a sole feed stock into an evaporator, said evaporator being at a temperature of operation above the temperature of condensation of said first vapor fraction; vaporizing at least a portion of said first condensate in said evaporator to form a second vapor fraction and a predetermined liquid fraction;

inimmately contacting said first condensate with said second vapor fraction while transferring a portion of said second vapor fraction to said first condensate and transferring a portion of said first condensate to said second vapor fraction;

removing said second vapor fraction from said evaporator after mass transfer of said second vapor fraction with said first condensate; and collecting said predetermined liquid fraction.

2. A method as defined in claim 1 further including maintaining the means for separating gas from liquid at a temperature about 40-60 F.° below a 90% distillation temperature of the collected predetermined liquid.

3. A method as defined in claim 1 further including introducing said first condensate to an upper portion of a stripping column;

conveying said first condensate downwardly in said stripping column; and conveying said second vapor fraction upwardly through said stripping column for intimate contact and mass transfer with said first condensate.

4. A method as defined in claim 1 including vaporizing said first vapor fraction at a temperature in the range of 540–640° F. and vaporizing the second vapor fraction at a temperature in the range of 100–500° F.

5. A method as defined in claim 4 wherein the second vapor fraction is vaporized at a temperature in the range of 200–450° F.

6. A method as defined in claim 1 wherein said petroleum oil is preheated by first transferring heat to said petroleum oil from said collected predetermined liquid fraction, then by transferring heat to said petroleum oil from said removed first residual liquid and then by transferring heat to said petroleum oil from an overhead vapor from said evaporator.

7. A method of separating a predetermined fraction of petroleum comprising:

preheating the petroleum to a first stage flash evaporator inlet temperature to form a two-phase petroleum feed;

adding said two-phase petroleum feed to said first stage flash evaporator;

condensing at least a portion of said first vapor fraction to form a first condensate;

feeding a petroleum fraction consisting essentially of said first condensate as essentially a sole feed stock into a second stage evaporator; vaporizing at least a portion of said first condensate in said second stage evaporator to form a second vapor fraction and a predetermined petroleum fraction;

intimately contacting said first condensate with said second vapor fraction without intermediate removal of any substantial amount of a lower boiling fraction of said first condensate before said contact, while transferring portion of said second vapor fraction to said first condensate and transferring a portion of said first condensate to said second vapor fraction;

removing said second vapor fraction from said second stage evaporator after mass transfer of said second vapor fraction with said first condensate; and collecting said predetermined liquid fraction.

8. A method of separating fuel oil from crude petroleum oil comprising:

separating a first vapor fraction of said crude petroleum oil from a first liquid fraction of said crude petroleum oil in a first stage evaporator;

removing said first liquid fraction from said first stage evaporator such that said first liquid fraction is not conveyed to a second stage evaporator;

condensing at least a portion of said first vapor fraction to form a second liquid fraction;

feeding a petroleum fraction consisting essentially of said second liquid fraction into the second stage evaporator; vaporizing at least a portion of said second liquid fraction in said second stage evaporator to form a second vapor fraction;

intimately contacting said second liquid fraction with said second vapor fraction in a stripping column for mass transfer between said second liquid fraction and said second vapor fraction;

removing said second vapor fraction from said second stage evaporator after mass transfer of said second vapor fraction with said first condensate; and collecting the second liquid fraction, after mass transfer with said second vapor fraction, as said fuel oil.

9. A method as defined in claim 8 further including collecting said second vapor fraction, after mass transfer with said second liquid fraction, and then condensing said second vapor fraction to form a third liquid fraction.

10. A method as defined in claim 9 further including adding a portion of said first vapor fraction to said second vapor fraction and condensing said added first vapor fraction portion to form a portion of said third liquid fraction.

11. A method as defined in claim 8 further including indirectly contacting the crude petroleum oil with the collected fuel oil, the first liquid fraction, and a portion of said first vapor fraction to preheat said crude oil.

12. A method of separating a fraction from petroleum oil comprising:

vaporizing a portion of a petroleum oil to form a first vapor and thereafter condensing a portion of said first vapor to form a condensate;

feeding a petroleum fraction consisting essentially of said condensate as essentially a sole feed stock into an evaporator; vaporizing at least a portion of said condensate in said evaporator to form a second vapor fraction and a predetermined liquid fraction;

removing said second vapor fraction from said evaporator after mass transfer of said second vapor fraction with said first condensate; and collecting an unvaporized portion of said condensate from said evaporator.

13. A method of separating a predetermined fraction from petroleum oil comprising:

preheating the petroleum oil to form preheated petroleum oil;

vaporizing a portion of the preheated petroleum oil in a first stage flash evaporator to form a first vapor fraction and a first residual liquid;

separating the first vapor from the first residual liquid and removing the first residual liquid to prevent contact of said first residual liquid with a second vapor fraction formed in a second stage evaporator;

condensing at least a portion of said first vapor fraction to form a first condensate at a temperature lower than a temperature of operation of a second stage evaporator;

feeding a petroleum fraction consisting essentially of said first condensate into said second stage evaporator;

vaporizing at least a portion of said first condensate in said second stage evaporator to form a second vapor fraction and a predetermined liquid fraction;

intimately contacting said first condensate with said second vapor fraction while transferring a portion of said second vapor fraction to said first condensate and transferring a portion of said first condensate to said second vapor fraction;

removing said second vapor fraction from said second stage evaporator after mass transfer of said second vapor fraction with said first condensate; and collecting said predetermined liquid fraction.

14. A method as defined in claim 13 wherein said second stage evaporator comprises a boiling type evaporator and further including heating said first condensate to vaporize a portion of said first condensate in said second stage evaporator to form said second vapor fraction.

15. A method as defined in claim 14 further including heating said first condensate to a temperature substantially equal to a flash temperature of the collected predetermined liquid.

16. A method as defined in claim 13 further including condensing said first condensate at a temperature at least 50° F. below a temperature of operation of said second stage evaporator.

17. A method as defined in claim 16 including conveying said first condensate, for intimate contact and mass transfer with said second vapor fraction, at a temperature of 50–150 F.° less than the temperature of operation of said second stage evaporator.

18. A method as defined in claim 13 wherein an uncondensed portion of said first vapor fraction which is not fed to said second stage evaporator, is condensed and collected as a liquid product.

19. A method as defined in claim 18 including removing an overhead vapor from said second stage evaporator, and condensing said overhead vapor to form an overhead liquid fraction.

20. A method as defined in claim 13 including removing an overhead vapor fraction from said second stage evaporator and condensing said vapor fraction to provide an overhead liquid product.

21. A method as defined in claim 19 including combining said overhead liquid product with said collected liquid product.

22. A method of separating a fraction from petroleum oil comprising:

preheating the petroleum oil to form preheated petroleum oil;

vaporizing a portion of the preheated petroleum oil in a first stage flash evaporator to form a first vapor fraction and a first residual liquid;

separating the first vapor from the first residual liquid and removing the first residual liquid to prevent any substantial portion of said first residual liquid from combining with said separated petroleum oil fraction in a second stage evaporator;

condensing at least a portion of said first vapor fraction to form a first condensate at a temperature lower than a temperature of operation of the second stage evaporator;

feeding a petroleum fraction consisting essentially of said first condensate into said second stage evaporator;

vaporizing at least a portion of said first condensate in said second stage evaporator to form a second vapor fraction and a predetermined liquid fraction;

said preheating of said petroleum oil including heat exchange of said petroleum oil with said second vapor fraction and collecting said predetermined liquid fraction.

23. A method of separating a predetermined fraction from petroleum comprising:

preheating the petroleum to form preheated petroleum;

feeding said preheated petroleum into a first stage evaporator;

vaporizing a portion of the preheated petroleum in said first stage evaporator to form a first vapor fraction and a first residual liquid in said first stage evaporator;

removing said first vapor fraction and said first residual liquid from said first stage evaporator;

condensing at least a portion of said removed first vapor fraction to form a first consensate;

feeding a petroleum fraction consisting essentially of said first condensate as essentially a sole feed stock into a second stage evaporator wherein said second stage evaporator is essentially only a boiling-type evaporator such that a lower boiling portion of said first condensate ia not flashed off prior to vaporization of a portion of said first condensate in said second stage evaporator;

vaporizing at least a portion of said first condensate in said second stage evaporator to form a second vapor fraction and a predetermined liquid fraction; and collecting said predetermined liquid fraction.

24. A method of separating a predetermined fraction from petroleum oil comprising:

preheating the petroleum oil to form preheated petroleum oil;

feeding said preheated petroleum oil into a first stage evaporator;

vaporizing a portion of the preheated petroleum oil in said first stage evaporator to form a first vapor fraction and a first residual liquid in said first stage evaporator;

condensing at least a portion of said removed first vapor fraction to form a first condensate:

feeding a petroleum fraction consisting essentially of said first condensate as essentially a sole feed stock into a second stage evaporator under such conditions that substantially no flashing of said first condensate occurs in said second stage evaporator;

vaporizing at least a portion of said first condensate in said second stage evaporator to form a second vapor fraction and a predetermined liquid fraction.

25. A method of separating a predetermined fraction from petroleum oil comprising:

preheating the petroleum oil to form preheated petroleum oil;

feeding said preheated petroleum oil into a first stage evaporator;

vaporizing a portion of the preheated petroleum oil in said first stage evaporator to form a first vapor fraction and a first residual liquid in said first stage evaporator;

removing said first vapor fraction and said first residual liquid from said first stage evporator;

condensing at least a portion of said removed first vapor fraction to form a first condensate;

feeding a petroleum fraction consisting essentially of said first condensate directly into a second stage evaporator, as essentially a sole feed stock to said second stage evaporator, without intermediate vaporization of said condensate, wherein said second stage evaporator is essentially only a boiling-type evaporator;

vaporizing at least a portion of said first condensate in said second stage evaporator to form a second vapor fraction and a predetermined liquid fraction;

contacting said first condensate with said second vapor fraction to transfer a portion of said second vapor fraction to said first condensate.

removing a remainder of said second vapor fraction from said second stage evaporator after mass transfer of said vapor fraction with said first condensate; and collecting said predetermined liquid fraction.

26. A method of separating a predetermined fraction from petroleum oil comprising:

preheating the petroleum oil to form preheated petroleum oil;

feeding said preheated petroleum oil into a first stage evaporator;

vaporizing a portion of the preheated petroleum oil in said first stage evaporator to form a first vapor fraction and a first residual liquid in said first stage evaporator;

removing said first vapor fraction and said first residual liquid from said first stage evaporator;

condensing at least a portion of said removed first vapor fraction to form a first condensate;

feeding a petroleum fraction consisting essentially of said first condensate directly into a second stage evaporator, without intermediate vaporization of said condensate, wherein said second stage evaporator is essentially only a boiling-type evaporator;

vaporizing at least a portion of said first condensate in said second stage evaporator to form a second vapor fraction and a predetermined liquid fraction;

contacting said first condensate with said second vapor fraction to transfer a portion of said second vapor fraction to said first condensate.

removing a remainder of said second vapor fraction from said second stage evaporator after mass transfer of said vapor fraction with said first condensate; and collecting said predetermined liquid fraction.

* * * * *